United States Patent [19]

Martin et al.

[11] Patent Number: 5,254,765
[45] Date of Patent: Oct. 19, 1993

[54] PROCESS AND APPARATUS FOR THE PRODUCTION OF AROMATIC HYDROCARBONS FROM AN ALIPHATIC HYDROCARBON CHARGE IN A REACTOR HEATED BY A FLUIDIZED PARTICLE BED

[75] Inventors: Gerard Martin, Rueil Melmaison; Pierre Renard, Saint Nom La Breteche, both of France

[73] Assignee: Institut Francais de Petrole, Rueil Malmaison, France

[21] Appl. No.: 620,412

[22] Filed: Dec. 3, 1990

[51] Int. Cl.$^5$ .................... C07C 15/00; C07C 2/52
[52] U.S. Cl. .................... 585/407; 585/418; 585/921; 585/924; 585/926
[58] Field of Search ........... 585/407, 418, 921, 924, 585/926

[56] References Cited

U.S. PATENT DOCUMENTS

| | | | |
|---|---|---|---|
| 2,690,051 | 9/1954 | Peskin | 252/71 |
| 2,886,507 | 5/1959 | Elliott et al. | 208/78 |
| 4,175,057 | 11/1979 | Davies et al. | 252/455 Z |
| 4,180,689 | 12/1979 | Davies et al. | 595/407 |
| 4,224,298 | 9/1980 | Robinson | 523/359 |
| 4,914,255 | 4/1990 | Avidan et al. | 585/418 |
| 4,973,778 | 11/1990 | Harandi et al. | 585/407 |

FOREIGN PATENT DOCUMENTS 2531944 2/1984 France.

OTHER PUBLICATIONS

"Fluidized-bed Heat Exchanger Avoids Fouling Problems," 95 Chem. Eng. 43 (1988).

*Primary Examiner*—Anthony McFarlane
*Assistant Examiner*—Nhat D. Phan
*Attorney, Agent, or Firm*—Millen, White, Zelano, & Branigan

[57] ABSTRACT

The invention relates to a process and an apparatus for the production of aromatic hydrocarbons from an aliphatic hydrocarbon charge with 2 to 12 carbon atoms.

The process comprises a stage of contacting a charge of at least one aliphatic hydrocarbon with 2 to 12 carbon atoms and a zeolitic catalyst composition optionally containing at least one metal, in a reaction zone (40) containing reaction tubes (3), said reaction zone being heated by at least partial immersion in an enclosure (1) containing a fluidized particle bed (13), characterized in that said particle bed is at least partly heated by a heat supply (19,23) resulting from the injection of hot gases produced in a zone outside said enclosure and introduced into the fluidized bed under conditions such that the reaction temperature is 400° to 600° C.

Application to the production of benzene, toluene and xylenes.

14 Claims, 2 Drawing Sheets

PROCESS AND APPARATUS FOR THE PRODUCTION OF AROMATIC HYDROCARBONS FROM AN ALIPHATIC HYDROCARBON CHARGE IN A REACTOR HEATED BY A FLUIDIZED PARTICLE BED

BACKGROUND OF THE INVENTION

The present invention relates to a process for the production of aromatic hydrocarbons from an aliphatic hydrocarbon charge having 2 to 12 carbon atoms in the presence of a zeolitic crystalline catalyst composition. It more particularly relates to the synthesis of a mixture mainly consisting of benzene, toluene and xylenes, which can improve the octane rating of petroleum products. It also relates to a hydrocarbon conversion apparatus, in particular for performing the aforementioned process.

The valorization of low boiling point aliphatic fractions, such as LPG's, justifies the interest attached to processes for the conversion of said hydrocarbons, which are efficient, selective and economic, while also contributing to the formation of hydrogen as a by-product.

The aromatic hydrocarbon production reaction has in particular been described in U.S. Pat. Nos. 3,760,024, 3,756,942 and 3,855,980 in the presence of a silica and alumina-based crystalline zeolitic catalyst of the MFI type, such as ZSM5 or ZSM12, optionally with a metal such as gallium in the skeleton or in the presence of a zeolitic catalyst containing a metal outside the skeleton and as described in French Patent 2374 283 and U.S. Pat. No. 4,175,057.

The elementary processes involved in the transformation of aliphatic hydrocarbons into aromatic hydrocarbons are mainly the dehydrogenation of paraffins, the oligomerization of unsaturated hydrocarbons and the cyclization of oligomers. The reaction is highly endothermic, the reaction rate being sensitive to temperature variations, and said successive reactions are accompanied by a deposition of coke on the catalyst and a reduction of the metallic oxides contained in said catalyst, which very rapidly deactivates the catalyst.

It is known from U.S. Pat. No. 4,224,298 to use a fluidized particle bed for heating the tubes in which the reforming of hydrocarbons takes place with a view to obtaining synthesis gas at a temperature of 750° to 800° C. In this case, the external temperature of the skin of the reaction tubes is approximately 975° C. The fluidized bed is heated by the combustion of a fuel and a combustion supporter directly in the particle bed. This apparatus suffers from the disadvantage of only being able to operate at high temperatures, i.e. it lacks the flexibility to enable it to be used in all reforming procedures. Moreover, it suffers from all the disadvantages resulting from preforming combustion in a fluidized bed.

There can firstly be problems of the dispersion of the fuel within the bed, particularly when the diameter of the latter exceeds e.g. 3 meters and when it is occupied by a large number of tubes. Under these conditions, the distribution of heat over the tubes is no longer homogeneous and there are risks of post-combustion beyond the fluidized bed.

It can also be difficult to check and control the bed operating at above 1000° C., particularly during transient phases. In this case, there is a risk of the solidifying of the complete bed linked with local overheating in poorly fluidized areas. Thus, for example, in the case of an emergency stoppage of the apparatus, if the fuel supporter flow has not been completely stopped, the oxidation of the fuel present in the bed can continue in a fixed bed. This leads to a significant bed temperature rise through the absence of any heat exchange with the tubes, which may even lead to the melting of the bed.

In addition, French Patent 2531 944 describes a reforming process using the vapor of a hydrocarbon charge, so as to obtain a hydrogen-containing gas as the essential constituent. The reaction zone is heated via a fluidized particle bed, which is in turn heated by burners mounted directly on the reactor wall, so that combustion takes place within the fluidized bed to the extent that the temperature thereof is at least 750° C.

In addition, French Patent 2374 283 proposes a gallium zeolite composition used in a process for the production of aromatic hydrocarbons from an aliphatic hydrocarbon charge.

SUMMARY OF THE INVENTION

One of the problems to be solved consists of ensuring a uniformity of the heating of the reaction zone at approximately 500° to 600° C., making it possible to obtain a very flat or shallow temperature profile throughout the zone knowing that the catalyst is sensitive to a temperature rise and can be desire yed when the critical temperature is exceeded.

Another problem to be solved relates to the regeneration of the catalyst, which must be fast and of variable frequency as a function of the temperature of the reaction directly dependent on the charge to be treated. This regeneration must be sufficiently gentle to preserve the performance characteristics of the catalyst and minimize its renewal rate.

The object of the present invention is to solve the problems referred to hereinbefore, in such a way as to improve the conversion rates into aromatic hydrocarbons and the life of the catalyst.

The present invention more particularly relates to a process for the production of aromatic hydrocarbons comprising a stage of contacting a charge of at least one aliphatic hydrocarbon with 2 to 12 carbon atoms and a zeolitic catalyst composition optionally containing at least one metal in a reaction zone under appropriate reaction conditions for recovering a mixture incorporating aromatic hydrocarbons and a spent zeolitic catalyst is obtained with a minimum coke deposition during the reaction, said reaction zone being heated by an at least partial immersion in an enclosure containing a fluidized particle bed, characterized in that the said bed is at least partly heated by heat supply resulting from the injection of hot gases produced in a zone outside said enclosure and introduced into the fluidized bed under conditions such that the reaction temperature is 400° to 600° C.

According to a feature of the process, the reaction zone can comprise at least one reaction tube located vertically or horizontally in the enclosure containing the fluidized bed.

This fluidized bed generally comprises particles having a particle size normally between 20 and 5000 microns preferably between 50 and 200 microns and with a density between 1000 and 6000 kg/m$^3$ and preferably 1500 and 3000 kg/m$^3$. Their shape can be of a random nature, but is advantageously spherical.

The bed generally comprises inert particles, e.g. at least partly sand and is generally heated to a temperature well above the reaction temperature in the tubular reaction zone, e.g. 480° to 600° C., under heating conditions such that the temperature difference between the heating fluidized bed and the catalyst is normally between 5° and 100° C. and advantageously between 20° and 40° C.

According to another feature of the invention, the particle bed is normally fluidized by means of a fluidization gas e.g. injected by tubes provided with orifices and which are known to the expert, being located at the base of the preferably cylindrical enclosure. The fluidization gas flow rates are such that the surface velocity is between 0.01 and 1.00 m/s and is preferably between 0.1 and 0.3 m/s. Under these conditions, the quasi-isothermicity of the bed is ensured and due to good heat transfer coefficients between the bed and the inner wall of the tube, the life of the catalyst is increased and the selectivity of the reaction improved. These fluidization gases can be recovery gases from a furnace or boiler, preheated air or turbine effluents.

The fluidized particle bed can, in part, be heated by fluidization gases injected at a sufficiently high temperature and preferably by injections of hot gases directly into the bed. It is also possible to at least partly recycle particles drawn off from the enclosure and then reheated outside the latter, e.g. during the regeneration of the catalyst, if the latter takes place outside the enclosure where reactions leading to aromatization take place.

According to a feature of the process, the regeneration stage of the catalyst can be carried out in the same reaction tube disposed in the enclosure containing the fluidized bed in which the reaction stage has taken place.

At least part of the heat given off during said regeneration by the combustion reaction is then exchanged with the fluidized bed. The catalyst regeneration reaction, which is exothermic, then significantly contributes to the thermal balance of the process, because it at least partly compensates for the heat loss due to the endothermicity of the aromatization reaction.

It is possible to envisage any combination of heat supply to the fluidized bed of the type described hereinbefore. Thus, it has been possible to obtain excellent results through the heat supply due to the regeneration of the catalyst and at least one injection of gases heated to a temperature between 1200° and 2200° C. by fuel gas burners and directly introduced into the fluidized bed, preferably at the side wall thereof.

According to a preferred embodiment of the process according to the invention, the reaction zone can comprise a plurality of parallel reaction tubes grouped into bundles, the latter being supplied in parallel. At least part of them is adapted to carrying out the aromatization of the charge, while the other part carries out the catalyst regeneration stage. When the regeneration is substantially ended, the tubes previously functioning in regeneration, then function as an aromatization reactor. This alternating operation using a set of valves is very flexible.

The catalyst can be under moving or fixed bed conditions, but preferably fixed bed. Under fixed bed conditions, there is a reduction of the mechanical wear phenomena mainly due to the circulation of the catalyst, which otherwise lead to the formation of a large quantity of fines, to disturbances in the operation of the unit, to the entrainment of these fines by reaction products and consequently deterioration of the downstream product treatment units, as well as to an increase in catalyst consumption.

The process according to the invention leads to the following advantages. As a result of its temperature uniformity and excellent heat exchange coefficients, the fluidized bed ensures a substantially constant temperature over the entire length of the tube, as well as over all the tubes constituting the reaction zone, even if the bundles incorporate several hundred, or even thousand tubes. The radial temperature profile is then substantially flat. As a result of this temperature uniformity over the entire catalyst volume, there is a better catalyst utilization. The temperature uniformity of the bed is also an advantage during the regeneration of the catalyst in the enclosure. It makes it possible to easily start the oxidation of the coke and carry out said regeneration more rapidly than in other configurations, because the calories given off by the oxidation are rapidly transferred to the bed.

The temperature difference between the heating medium and the catalyst is preferably between approximately 20° and 40° C., so that the catalyst will be at the temperature of the bed in the case of a total or partial closing or blocking of one of the tubes by excessive coke deposition and therefore will be under conditions which will not lead to the destruction thereof.

When several tube bundles are immersed in the same fluidized bed, part of the heat supply can come from the regeneration when the bundles operate in alternating manner, the process then becoming more energy economic.

The thus described technology also makes it possible to reduce the passage time between the reaction cycle and the regeneration cycle, because the bed temperature is the same in both cases.

For a given capacity, the overall dimensions of the bundle are much smaller than required e.g. for radiant furnaces.

This greater compactness obviously reduces the investment costs.

This technology, which has a very flexible form as a result of its modular nature can be adapted to both large and small capacities. It can be used both with a cyclic regeneration and with a continuous regeneration of the catalyst.

Generally the inert particles used as the fluidized bed are chosen from among refractory materials such as aluminium oxides, silica (sand), natural magnesium or calcium carbonates or mixtures thereof. Preference is given to the use of sand due to its ready availability and low price.

The reaction is generally performed in an inert atmosphere at a pressure between 0.2 and 10 bars and a temperature of 400° to 600° C. as a function of the nature of the charge. The temperature is advantageously 480° to 550° C. for an LPG fraction and 450° to 530° C. for an naphtha fraction, and a preferred pressure is 1 to 5 bars absolute. Preferably, said temperature is 500° to 530° C. for the LPG fraction and 480° to 510° C. for the naphtha fraction.

The catalyst used is generally a crystalline zeolite of the MFI type, such as ZSM zeolites, e.g. ZSM5, ZSM8, ZSM11, ZSM12, and ZSM35 described in U.S. Pat. No. 3,970,544. These zeolites could advantageously contain at least one metal. Reference is made in exemplified manner to zinc and gallium, preference being given to gallium. These metals can be inside or outside the skeleton.

It is also possible to use synthesized zeolites in a fluoride medium with or without metal.

The catalyst is preferably used in fixed bed form, which reduces attrition phenomena.

The spatial velocities recommended are normally 0.5 to 5 $h^{-1}$ and preferably 1.5 to 2.5 $h^{-1}$.

The aliphatic hydrocarbon charge generally comprises 2 to 12 carbon atoms. It advantageously contains LPG or naphtha, whereby the operating conditions can vary as a function of the nature of the charge. For example, in the case of a charge like LPG, it is possible to operate at a temperature above that which would be used for a charge such as naphtha. Therefore the unit makes it possible to very rapidly and by an easy control of the fluidized bed temperature, to accept charges having a variable composition.

In general terms, the operating conditions are optimized in such a way to convert at least 60% of the charge, particularly with LPG and advantageously at least 80% with an aromatic hydrocarbon level of at least 65% compared with the initial charge. Thus, the unconverted part of the charge can be recycled after separating the effluents.

Higher conversion rates or levels can be obtained with heavier charges, e.g. at least 95%.

Regeneration is generally carried out after a purging stage in the presence of a gas containing oxygen and in accordance with a known method (e.g. a $N_2 + O_2$ mixture). It is conventional practice to operate at a temperature between 450° and 650° C. and preferably between 480° and 560° C.

The following apparatus can be used for performing the process. It comprises an enclosure lined by an insulating material with an upper face, a lower face and a lateral envelope and it contains a reactor filled with an appropriate catalyst, said reactor being at least partly immersed in a fluidized bed of hot and preferably inert particles, the bed exchanging heat with said reactor and with bed fluidization means connected to the lower face of said enclosure. The reactor also comprises a plurality of substantially parallel and parallel-supplied reaction tubes, charge supply means connected to one end of said tubes and means for the recovery of the effluent containing aromatic hydrocarbons connected to the other end of the said tubes. Said enclosure is connected to at least one hot gas supply means, such as a hot gas generator located outside the said enclosure. The latter is advantageously connected to said envelope or is advantageously mounted on said envelope.

According to a feature of the apparatus, the enclosure can be cylindrical and the plurality of tubes constitutes an overall cylindrical or overall polygonal volume.

According to another feature, the hot gas supply means has an inlet of its transfer line in the lateral envelope, whose distance to the upper face of the enclosure is generally between quarter and half of the height of the lateral envelope which aids the temperature uniformity in the bed.

According to another feature, the hot gas supply means, e.g. a furnace containing at least one burner can be directly in contact with the wall of the enclosure and the hot combustion gases are introduced into the bed by means of an orifice made in the wall.

According to another feature, complementary fluidization means connected to the lower face of the enclosure can be added so as to fluidize the volume of the fluidized particle bed located between the lateral envelope of the enclosure and the fictional envelope determined by the plurality of reaction tubes with a higher fluidization rate than that supplied by the fluidization means of the bed at the reaction tubes. This arrangement favors the circulation of particles from the peripheral ring towards the center and therefore a better heat distribution and better heat exchange.

According to another feature, the apparatus generally comprises regeneration means suitable for regenerating the spent catalyst in the same tubes and in the same reaction enclosure where the aromatics production reaction has taken place. These regeneration means generally comprise a regeneration gas supply at one end of the bundle of tubes and a regeneration effluent discharge at the other end.

The apparatus can also have means suitable for connecting the reaction tubes alternately to the regeneration means and then to the means necessary for carrying out the reaction, in particular connecting one end of the tubes to the charge supply means and the other end to the means for discharging the effluent produced.

The process can also be performed using another variant of the apparatus according to the invention and which is described hereinafter. The apparatus comprises a plurality of reaction tubes and a plurality of regeneration tubes immersed in the fluidized bed and appropriate for regenerating the spent catalyst. These regeneration tubes are connected at one end to a regeneration gas supply and at the other end to a regeneration effluent discharge means. The apparatus also comprises means for connecting the reaction tubes alternately to the charge supply means by their first end and to the effluent recovery means by their second end, then to the regeneration gas supply by their first end and to the regeneration effluent discharge means by their second end. Moreover, said same means can connect the regeneration means alternately to the regeneration gas supply by their first end and to the regeneration effluent discharge means by their second end and then to the charge supply means by their first end and to the aromatic hydrocarbon effluent recovery means by their second end. These reaction tubes operate in the so-called reaction phase (production of aromatics), whilst the regeneration tubes operate in the so-called regeneration phase during a first stage and then the reaction tubes become regeneration tubes, whilst the regeneration tubes become reaction tubes during a second stage.

BRIEF DESCRIPTION OF THE DRAWINGS

The invention is described in greater detail hereinafter relative to the drawings illustrating in diagrammatic manner the process and apparatus according to the invention and in which show.

DETAILED DESCRIPTION OF THE DRAWINGS

Figure 1:
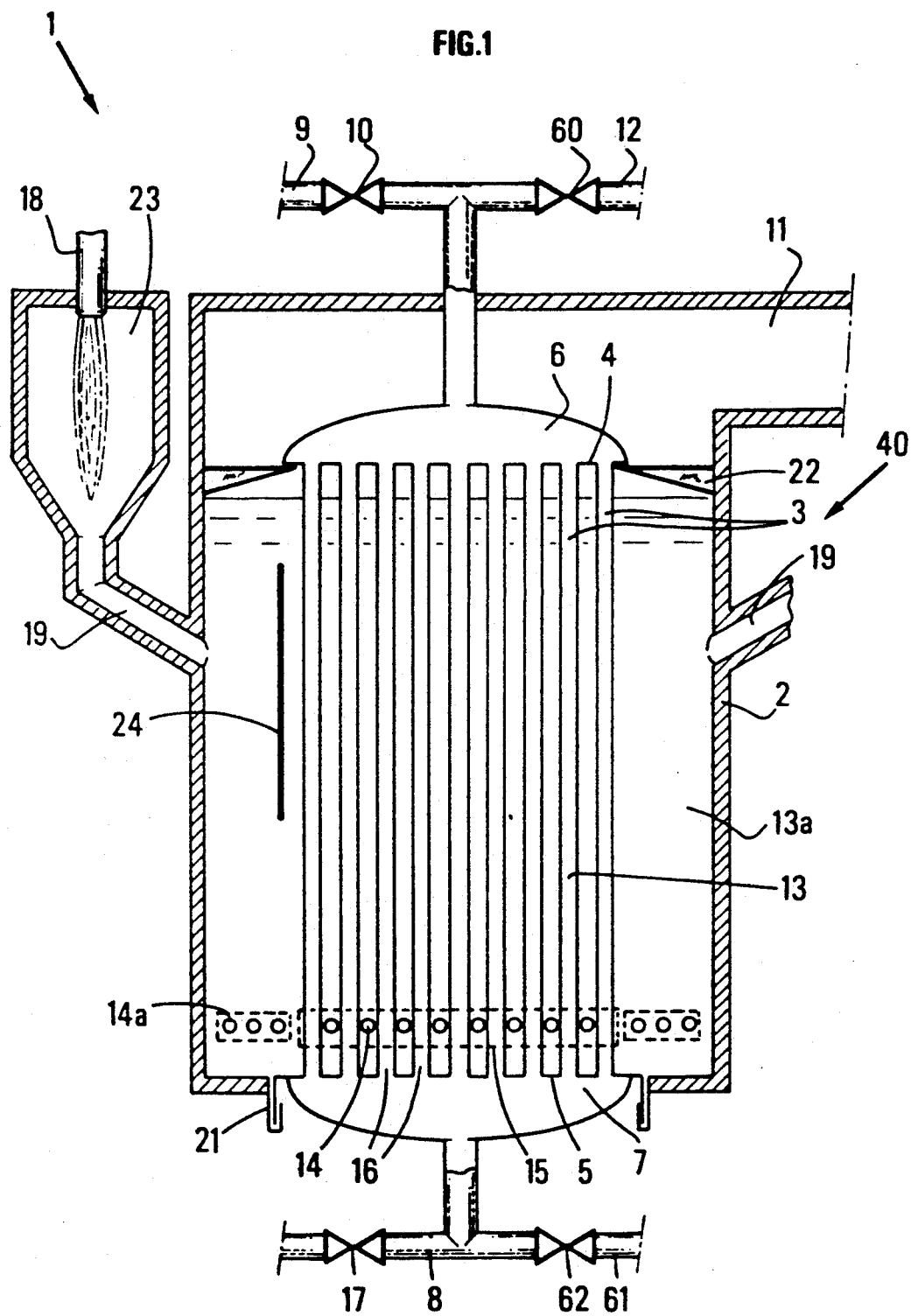
FIG. 1 the apparatus in longitudinal section.

According to FIG. 1, a cylindrical reaction enclosure 1 having a wall 2 covered by an insulating material comprises a tight reactor 40 immersed in a fluidized sand bed 13. This reactor has a plurality of stainless steel tubes 3 (e.g. 100 such tubes), which are cylindrical or cylindrical overall and are arranged vertically and secured by supporting elements 22. Their internal diameter is between 10 and 200 mm, preferably between 50 and 100 mm and their length is 2 to 20 m, preferably 3 to 10 m.

The tubes can be internally provided with transverse ribs in order to increase the heat transfer to the catalyst. These tubes are generally parallel to the enclosure axis and are grouped into cylindrical bundles with an interaxis distance between 1.5 and 6 times the external diameter of the tube and preferably between 2 and 3 times the external diameter. At their ends, the tubes are connected via upper and lower tubular plates 4 and 5 to a chamber 6 supplying the tubes with a charge introduced by the line 6 controlled by a valve 10 and to a chamber 7 recovering the reaction effluent discharged by the line 8 controlled by a valve 17. These tubular reactors contain a fixed zeolitic catalyst bed, e.g. ZSM5 and which can contain gallium in or outside the skeleton. This catalyst is introduced into the tubes in accordance with known methods.

The charge, e.g. LPG, is introduced by line 9 into the upper part of the reactor 40. It has e.g. been preheated by gases from the reactor in a convection zone located downstream of the outlet 11 of the enclosure 1. The volume occupied by the tubes represents 10 to 35% of the total volume of the fluidized bed in expansion.

The fluidized bed is constituted by sand particles of e.g. 0.1 mm. The fluidization gas is introduced into the base of the enclosure 1 by fluidization tubes 14 positioned in an adequate and substantially horizontal manner over the entire base of the reactor and the enclosure 1, substantially level with the lower end of the tubes 3 by which the reaction effluents are discharged. These fluidization beds have orifices directing the fluidization gas flow towards the bottom of the reactor and are in the form of an easily detachable comb which can be slid between the tubes 3 containing the catalyst. The fluidization tubes are connected to a collector 15. The number and shape of the orifices are such that there are no defluidized zones, where the heat transfer between the tubes and the bed could not be ensured.

The effluents from the reactor pass through diffusers 16 located at the bottom of the tubes 3 before passing out of the reactor by the line 8 and a control valve 17 directing them to a separation unit, which is not shown in the drawings. The peripheral part 13a of the reactor not occupied by the reaction tubes generally represents between 5 and 40% of the total volume of the bed.

This bed ring directly in contact with the heating gases described hereinafter has a higher fluidization speed, which makes it possible to more rapidly balance the temperature of the bed, due to an intense circulation of particles induced by apparent density differences of the medium between the center and the periphery.

This circulation of particles from the periphery towards the center of the enclosure 1 can be accentuated, if desired, by fluidization means 14a disconnected from the means 14 and located at the base thereof, which makes it possible to fluidize the particles at a higher speed at the periphery than in the centre.

Heating of the fluidized bed is essentially brought about by injections of hot gases at a temperature between 1200° and 2200° C. resulting from the total combustion of a fuel and a combustion supporter and obtained from e.g. fuel gas burners 18 located in at least one furnace 23 internally lined with refractory materials. The latter are located outside the enclosure 1 and are preferably connectedd to the cylindrical lateral envelope, being positioned in such a way that the hot gas flow resulting from the total combustion is introduced by a transfer line 19 in countercurrent with respect to the fluidization gases at a point located between the upper quarter and half the height of the enclosure. This transfer line is normally inclined towards the bottom of the reactor, so as to prevent particle accumulation. It would not pass outside the scope of the invention to use a transfer line or an orifice issuing at another point of the enclosure.

A protection device 24 prevents direct contact between the hot gases and the tubes.

Thus, there is a better contact between the heat and the particles; so the fluidized bed can be kept at a given temperature as a function of the type of charge, which is essentially the same throughout the reaction zone volume, e.g. close to 520° C. with a temperature difference between the sand bed and the catalyst of approximately 20° C.

The gases constituted by the mixture of heating and fluidization gases are recovered in the upper part of the reactor and discharged by the line 11 with a view to recovering the available heat. Obviously, they are never in contact with the charge. In the same way, the charge on the effluents are never in contact with the fluidized bed.

A device 21 at the bottom of the reactor is a sand joint, which makes it possible for the tubular bundle to expand downwards during the expansion of the tubes.

When the catalyst is deactivated, it is directly regenerated in the tubes where the reaction has taken place and in the same enclosure without modifying the fluidized bed operating conditions. To this end, the supply of charge by the valve 10 is stopped and the tubes are supplied with regeneration gases introduced by the line 12 provided with a valve 60. As the temperature of the fluidized bed is at an appropriate level, regeneration starts instantly. The regeneration effluent gases are discharged by the line 61 controlled by the valve 62.

It is optionally possible to modify the heating intensity of the burner in the furnace or optionally stop the supply of hot gases.

Prior to each passage from the reaction phase to the regeneration phase and from the regeneration phase to the reaction phase, there is generally an inert gas flow circulation for purging the apparatus.

Thus, the apparatus functions discontinuously, both in the reaction phase and in the regeneration phase with phase durations which may be the same or different.

Figure 2:
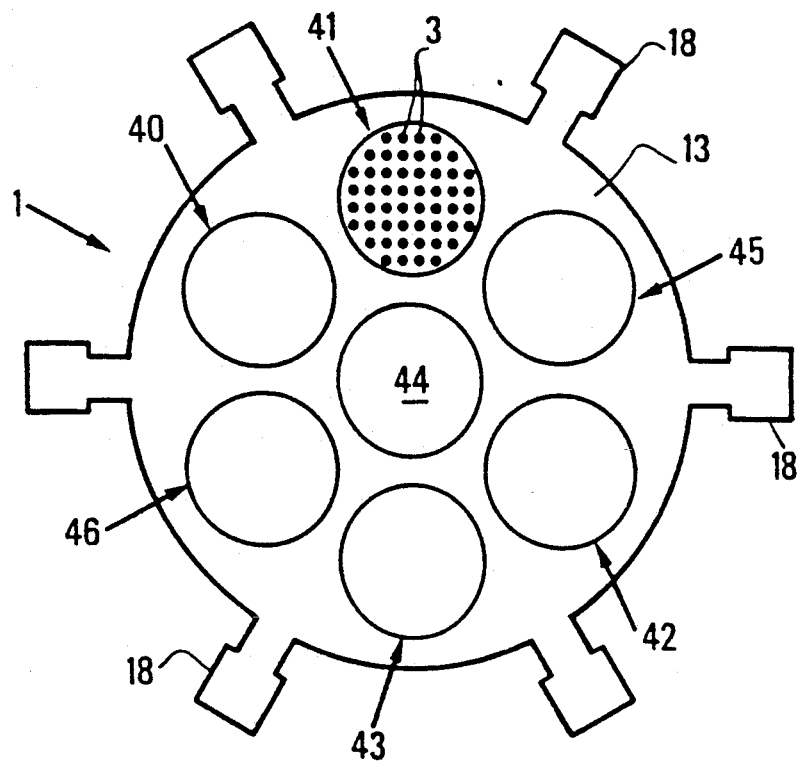
FIG. 2 in cross-section a fluidized bed reaction and regeneration zone in one and the same enclosure.

According to FIG. 2 illustrating an example of the reaction and regeneration of the catalyst in the same fluidized bed, the enclosure 1 contains the sand fluidized bed 13 heated by the aforementioned heating means 18. This enclosure contains a plurality of vertical tubes, like those described hereinbefore relative to FIG. 1 and which are supplied in parallel. These tubes can be alternately supplied by appropriate supply means from the aromatics production reactors 40,41,42,43,44 as a function of the process and post-reaction, spent catalyst regenerators 45,46.

Figure 3:
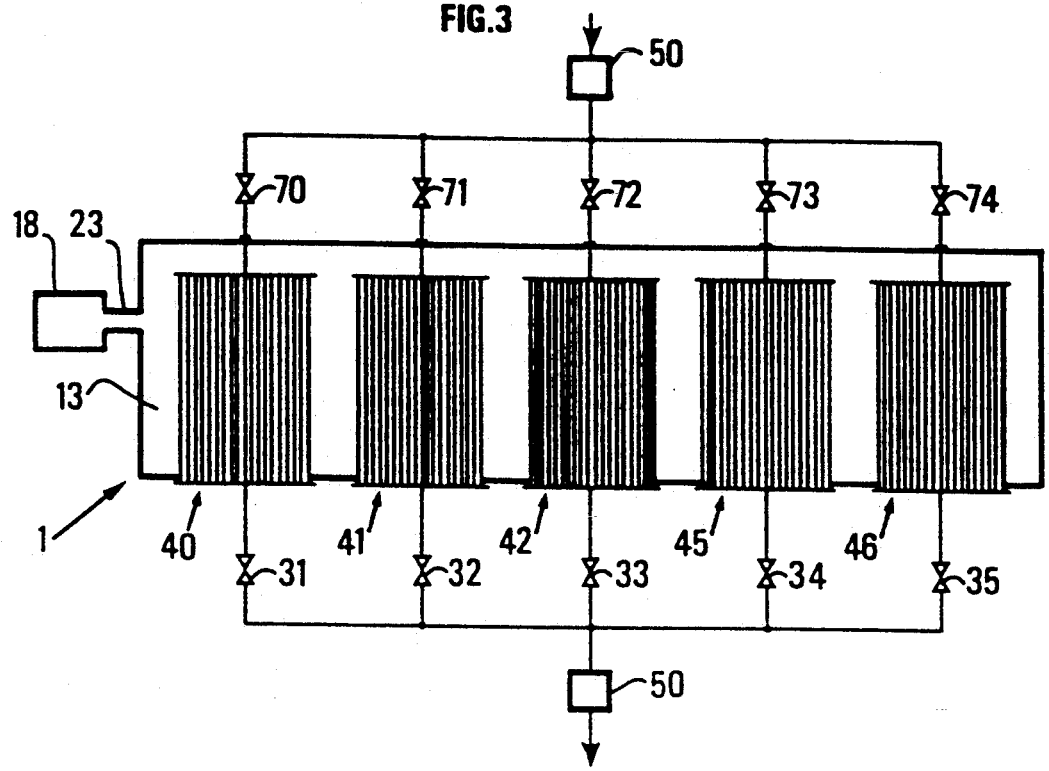
FIG. 3 a modular assembly, where the tubular reactors and tubular regenerators are located in the same enclosure.

FIG. 3 shows reactors 40,41,42 and regenerators 45,46. A set of open valves 70,71,72 makes it possible to bring about a parallel supply of the reactors with charge, whilst another set of closed valves 73,74 prevents the circulation of the charge in the regenerators 45,46, but allows the supply of a regeneration gas such as nitrogen and air. The function of the discharge valves 31,32, 33,34,35 of the two effluent types is identical to that of the preceding valves.

The heat given off by the combustion of the spent catalyst in the tubes operating in regeneration supplies part of the energy consumed by the reaction. All the said valves of the supply and discharge means are controlled by control means 50 enabling the bundles of tubes 40,41 and 42 to be alternately aromatic hydrocarbon production reactors and then regenerators and to the bundles 43 and 44 to be regenerators and then aromatic production reactors following a purging period. After the regeneration period said regenerators become reactors, whereas the other reactors become regenerators.

For illustration purposes are shown five tube bundles operating as a reactor and two functioning as a regenerator. Any other combination could obviously be realized and would remain within the scope of the invention.

We claim:

1. In a process for the production of aromatic hydrocarbons in a reaction zone incorporating a plurality of reaction tubes, said process comprising a stage a) of contacting inside said reaction tubes a charge of at least one aliphatic hydrocarbon with 2 to 12 carbon atoms and a zeolitic catalyst composition optionally containing at least one metal, under reaction conditions such that a mixture is recovered containing aromatic hydrocarbons and a spent zeolitic catalyst with a minimum of coke deposited during the reaction, said reaction tubes being heated by indirect heat exchange in an enclosure containing a fluidized particle bed fluidized by fluidization gas, whereby outside walls of said reaction tubes are heated by said fluidized particle bed, the improvement comprising heating said fluidized bed at least partly by a heat supply resulting from the injection of hot gases produced in an area outside said enclosure, and introducing the externally produced hot gases into the fluidized bed separately from said fluidization gas under conditions so as to provide a reaction temperature inside said reaction tubes of 400° to 600° C.

2. A process according to claim 1, wherein the reaction temperature is 480° to 550° C. for an liquefied petroleum gas (LPG) fraction.

3. A process according to claim 1, wherein the reaction temperature is 450° to 530° C. for a naphtha fraction.

4. A process according to claim 1, wherein the particle bed is at least partly heated by at least one injection into the bed of hot gases from at least one furnace equipped with at least one burner.

5. A process according to claim 1, wherein the particle bed is at least partly heated by fluidization gases.

6. A process according to claim 1, wherein a catalyst regeneration stage b) is carried out in the same reaction zone as that of stage a) the particle bed being at least partly heated by the heat generated by the regeneration of the catalyst.

7. A process according to claim 1, wherein the fluidized bed exchanges heat with said reaction tubes under conditions such that the temperature difference between the fluidized bed and the catalyst is 5° to 100° C.

8. A process according to claim 1, further comprising following the recovery of the hydrocarbon mixture, the following: stage a) stopping the contacting of the charge with the catalyst and optionally purging the reaction zone; (b) regenerating the catalyst in the same reaction zone as that of stage a); (c) discharging a regeneration effluent and optionally purging of the reaction zone, and repeating cycles of reacting and regeneration in said reaction tubes.

9. A process according to claim 8, wherein the reaction zone comprises a plurality of tubes arranged in parallel, at least part being for performing stage a), while the other part is for performing stage b).

10. A process according to claim 1, wherein the catalyst is in the form of a fixed bed.

11. A process according to claim 1, wherein the external heat supply is introduced by a transfer line connected to a point located between the upper quarter and upper half of the enclosure.

12. A process according to claim 1, wherein the fluidized bed comprises a direct contact zone with the reaction zone and a peripheral zone with respect to said reaction zone and the zone of the bed on the periphery of the reaction zone is fluidized at a higher rate than that of the zone of the bed in direct contact with the reaction zone.

13. A process according to claim 1, wherein the fluidized bed exchanges heat with the said reaction tubes under conditions such that the temperature difference between the fluidized bed and the catalyst is 20° to 40° C.

14. A process according to claim 1, wherein fluidization gases are passed upwardly into said enclosure from the bottom thereof, and said externally produced hot gases are passed countercurrently to said fluidization gases.

* * * * *